(12) United States Patent
Martin (10) Patent No.: US 9,961,536 B2
(45) Date of Patent: May 1, 2018

(54) SYSTEM AND METHOD FOR IMPLEMENTING HISTOGRAM CONTROLLED MOBILE DEVICES

(71) Applicant: WaveMarket, Inc., Emeryville, CA (US)

(72) Inventor: Brian Martin, Moraga, CA (US)

(73) Assignee: Location Labs, Inc., Emeryville, CA (US)

(*) Notice: Subject to any disclaimer, the term of this patent is extended or adjusted under 35 U.S.C. 154(b) by 267 days.

(21) Appl. No.: 14/613,714

(22) Filed: Feb. 4, 2015

(65) Prior Publication Data

US 2015/0163664 A1 Jun. 11, 2015

Related U.S. Application Data (62) Division of application No. 13/350,497, filed on Jan. 13, 2012, now Pat. No. 8,954,571.

(51) Int. Cl.
| | |
|---|---|
| *H04W 8/20* | (2009.01) |
| *H04M 1/725* | (2006.01) |
| *H04W 4/02* | (2018.01) |
| *H04L 29/06* | (2006.01) |

(52) U.S. Cl.
CPC ............... *H04W 8/20* (2013.01); *H04L 63/20* (2013.01); *H04M 1/72577* (2013.01); *H04W 4/02* (2013.01); *H04L 63/107* (2013.01)

(58) Field of Classification Search
CPC ..... H04L 63/107; H04L 63/20; H04L 63/101; H04W 8/20; H04W 4/02; H04W 12/12; H04W 4/18; H04M 1/72577

USPC ........................................................ 709/224
See application file for complete search history.

(56) References Cited

U.S. PATENT DOCUMENTS

| | | | |
|---|---|---|---|
| 4,956,825 A | 9/1990 | Wilts et al. | |
| 5,434,562 A | 7/1995 | Reardon | |
| 5,673,691 A | 10/1997 | Abrams et al. | |
| 5,882,258 A | 3/1999 | Kelly et al. | |
| 5,907,831 A | 5/1999 | Lotvin et al. | |
| 5,973,683 A | 10/1999 | Cragun et al. | |
| 6,023,692 A | 2/2000 | Nichols | |
| 6,529,724 B1 | 3/2003 | Khazaka et al. | |
| 6,731,746 B1 | 5/2004 | Usami | |

(Continued)

FOREIGN PATENT DOCUMENTS

| | | |
|---|---|---|
| EP | 1770969 | 4/2007 |
| FR | 2863439 | 6/2005 |
| WO | WO2011137279 | 11/2011 |

OTHER PUBLICATIONS

U.S. Appl. No. 14/291,983, filed May 30, 2014.

(Continued)

*Primary Examiner* — Tu Nguyen
(74) *Attorney, Agent, or Firm* — Dovas Law, P.C.

(57) ABSTRACT

A communication network and software for its implementation that controls a mobile device based on historical user activity is provided. The mobile device communicates with a server and includes a function that is dependent on the user activity. The server senses the user activity over time and produces a histogram of that activity. The rate at which the server attempts to sense the user activity depends on the histogram. An application might change the function depending on the result of detecting the user activity and the rate at which it does so.

28 Claims, 8 Drawing Sheets

(56) References Cited

U.S. PATENT DOCUMENTS

| | | |
|---|---|---|
| 7,106,843 B1 | 9/2006 | Gainsboro et al. |
| 7,178,720 B1 | 2/2007 | Strubbe et al. |
| 7,272,633 B2 | 9/2007 | Malik et al. |
| 7,313,383 B2 | 12/2007 | Fujii |
| 7,839,891 B1 | 11/2010 | Allan |
| 7,925,690 B2 | 4/2011 | Smith et al. |
| 8,010,037 B2 | 8/2011 | Bannwolf et al. |
| 8,024,290 B2 | 9/2011 | Yang et al. |
| 8,095,413 B1 | 1/2012 | Beaven |
| 8,121,879 B1 | 2/2012 | Cohen |
| 8,135,392 B2 | 3/2012 | Marcellino et al. |
| 8,160,560 B2 | 4/2012 | Geyer et al. |
| 8,193,982 B2 | 6/2012 | Kupfer et al. |
| 8,249,627 B2 | 8/2012 | Olincy et al. |
| 8,315,597 B2 | 11/2012 | Olincy et al. |
| 8,369,838 B2 | 2/2013 | Mallavarapu et al. |
| 8,401,521 B2 | 3/2013 | Bennett et al. |
| 8,503,994 B1 | 8/2013 | Sanjeev |
| 8,621,075 B2 | 12/2013 | Luna |
| 8,738,688 B2 | 5/2014 | Myers et al. |
| 8,768,286 B2 | 7/2014 | Naboulsi |
| 8,825,035 B2 | 9/2014 | Moton, Jr. et al. |
| 8,849,095 B2 | 9/2014 | Hoofien et al. |
| 9,124,703 B2 | 9/2015 | Tadayon et al. |
| 2002/0174180 A1 | 11/2002 | Brown et al. |
| 2002/0178046 A1 | 11/2002 | Lawrence |
| 2003/0005306 A1 | 1/2003 | Hunt et al. |
| 2003/0082508 A1 | 5/2003 | Barney |
| 2003/0211889 A1 | 11/2003 | Walker et al. |
| 2003/0216138 A1 | 11/2003 | Higuchi et al. |
| 2004/0024569 A1 | 2/2004 | Camillo |
| 2004/0030599 A1 | 2/2004 | Sie et al. |
| 2004/0039624 A1 | 2/2004 | Ikezawa et al. |
| 2004/0083472 A1 | 4/2004 | Rao et al. |
| 2004/0219493 A1 | 11/2004 | Phillips |
| 2004/0267607 A1 | 12/2004 | Maddux |
| 2005/0003895 A1 | 1/2005 | Nara |
| 2005/0096030 A1 | 5/2005 | Boyd et al. |
| 2005/0287502 A1 | 12/2005 | Southard et al. |
| 2006/0270476 A1 | 11/2006 | Denkewics |
| 2007/0039624 A1 | 2/2007 | Roberts et al. |
| 2007/0041545 A1 | 2/2007 | Gainsboro |
| 2007/0150567 A1 | 6/2007 | Lamparello et al. |
| 2007/0208802 A1 | 9/2007 | Barman et al. |
| 2007/0263843 A1 | 11/2007 | Foxenland |
| 2008/0176585 A1 | 7/2008 | Eldering |
| 2008/0201469 A1 | 8/2008 | Reasor et al. |
| 2008/0246605 A1 | 10/2008 | Pfeffer et al. |
| 2008/0299954 A1 | 12/2008 | Wright et al. |
| 2009/0038005 A1 | 2/2009 | Howarth |
| 2009/0055938 A1 | 2/2009 | Samuel |
| 2009/0089876 A1 | 4/2009 | Finamore et al. |
| 2009/0181356 A1 | 7/2009 | Dasgupta |
| 2009/0204471 A1 | 8/2009 | Elenbaas et al. |
| 2009/0247124 A1 | 10/2009 | de Atley et al. |
| 2009/0298019 A1 | 12/2009 | Rogan et al. |
| 2010/0028844 A1 | 2/2010 | Wiseman |
| 2010/0037088 A1 | 2/2010 | Krivopaltsev et al. |
| 2010/0058446 A1 | 3/2010 | Thwaites |
| 2010/0076274 A1* | 3/2010 | Severson ............. A61B 5/16 600/300 |
| 2010/0116884 A1 | 5/2010 | Alderucci et al. |
| 2010/0125028 A1 | 5/2010 | Heppert |
| 2010/0211887 A1 | 8/2010 | Woollcombe |
| 2010/0216509 A1 | 8/2010 | Riemer et al. |
| 2010/0250352 A1 | 9/2010 | Moore |
| 2010/0268768 A1 | 10/2010 | Kurtenbach et al. |
| 2010/0279626 A1 | 11/2010 | Bradley et al. |
| 2010/0285871 A1 | 11/2010 | Shah et al. |
| 2010/0317420 A1 | 12/2010 | Hoffberg |
| 2010/0330972 A1 | 12/2010 | Angiolillo |
| 2011/0029598 A1 | 2/2011 | Arnold et al. |
| 2011/0045868 A1 | 2/2011 | Sheha et al. |
| 2011/0047078 A1 | 2/2011 | Ginter et al. |
| 2011/0055546 A1 | 3/2011 | Klassen et al. |
| 2011/0070567 A1 | 3/2011 | Linton |
| 2011/0117878 A1 | 5/2011 | Barash et al. |
| 2011/0236872 A1 | 9/2011 | Taylor |
| 2011/0252375 A1 | 10/2011 | Chaudhri |
| 2012/0008526 A1 | 1/2012 | Borghei |
| 2012/0066088 A1 | 3/2012 | Murset |
| 2012/0083287 A1 | 4/2012 | Casto et al. |
| 2012/0149352 A1* | 6/2012 | Backholm ......... H04W 52/0258 455/418 |
| 2012/0151384 A1 | 6/2012 | Stass et al. |
| 2012/0157076 A1 | 6/2012 | Choi et al. |
| 2012/0172027 A1 | 7/2012 | Partheesh et al. |
| 2012/0172100 A1 | 7/2012 | Colar et al. |
| 2012/0179767 A1 | 7/2012 | Clarke et al. |
| 2012/0192016 A1 | 7/2012 | Gotesdyner et al. |
| 2012/0214472 A1 | 8/2012 | Tadayon et al. |
| 2012/0215328 A1 | 8/2012 | Schmelzer |
| 2012/0226704 A1 | 9/2012 | Boland et al. |
| 2012/0253918 A1 | 10/2012 | Marois et al. |
| 2012/0260118 A1 | 10/2012 | Jiang et al. |
| 2012/0315880 A1 | 12/2012 | Peitrow et al. |
| 2012/0323990 A1 | 12/2012 | Hayworth |
| 2012/0330702 A1 | 12/2012 | Kowalski et al. |
| 2013/0040629 A1 | 2/2013 | Sprigg et al. |
| 2013/0054674 A1 | 2/2013 | Myers et al. |
| 2013/0084847 A1 | 4/2013 | Tibbitts et al. |
| 2013/0111510 A1 | 5/2013 | Baker et al. |
| 2013/0143512 A1 | 6/2013 | Hernandez et al. |
| 2013/0143521 A1 | 6/2013 | Hernandez et al. |
| 2013/0185411 A1 | 7/2013 | Martin |
| 2013/0198296 A1 | 8/2013 | Roy et al. |
| 2013/0217331 A1 | 8/2013 | Manente |
| 2013/0303106 A1 | 11/2013 | Martin |
| 2013/0303143 A1 | 11/2013 | Schrader et al. |
| 2013/0305384 A1 | 11/2013 | Weiss |
| 2013/0316746 A1 | 11/2013 | Miller et al. |
| 2013/0332886 A1 | 12/2013 | Cranfill et al. |
| 2013/0339345 A1 | 12/2013 | Soto Matamala et al. |
| 2013/0346333 A1 | 12/2013 | Hassler et al. |
| 2014/0082065 A1 | 3/2014 | Anakata |
| 2014/0179261 A1 | 6/2014 | Riggs et al. |
| 2014/0187219 A1 | 7/2014 | Yang et al. |
| 2014/0310365 A1 | 10/2014 | Sample et al. |
| 2014/0310403 A1 | 10/2014 | Weiss et al. |
| 2014/0364153 A1 | 12/2014 | Ren |
| 2014/0370857 A1 | 12/2014 | Bovis |
| 2015/0350410 A1 | 12/2015 | Weiss |
| 2016/0014262 A1 | 1/2016 | Hodges et al. |
| 2017/0132424 A9 | 5/2017 | Anakata |

OTHER PUBLICATIONS

U.S. Appl. No. 14/329,382, filed Jul. 11, 2014.

Kohavi, "Emerging Trends in Business Analytics", Communications of the ACM, Aug. 2002, vol. 45, No. 8, pp. 45-48.

* cited by examiner

SYSTEM AND METHOD FOR IMPLEMENTING HISTOGRAM CONTROLLED MOBILE DEVICES

CROSS REFERENCE TO RELATED APPLICATION(S)

This application is a divisional of U.S. patent application Ser. No. 13/350,497, filed Jan. 13, 2012, which is incorporated by reference as if fully set forth.

FIELD OF INVENTION

This invention generally relates to wired and wireless communications. More specifically, this invention relates to mobile devices whose functionality is influenced by their historical patterns of operations.

BACKGROUND

Mobile devices such as cellular telephones, smart phones, GPS systems, and cellular-enabled personal computers have become very common and very powerful. This combination of ubiquity and capability has created an ongoing demand for improved devices and unique applications. While applications currently exist for providing games, social networking, navigation assistance, locating of points of interest, location tracking, targeted advertising, and consumer and business-related services, even more capable, unique, and customizable applications are in demand.

A typical mobile device operates on a communication network that is provided by a mobile telephone operator. Such communication networks provide communication links and basic services such as time keeping and access to the public telephone network. A typically state-of-the-art mobile device, often referred to as a smartphone, may have built in features such as communication ports, touch screen displays, keyboards, orientation sensors, accelerometers, cameras, one or more timers, microphones, audio outputs, memory card readers, significant internal memory, and specialized software. Such mobile devices can provide a wide range of functionality such as telephone communications, texting, calendars, alarms, memo and note recording, GPS navigation, music (MP3) and video (MP4) playback, video calling, conference calling, movie playback, picture taking and sending, games, e-mails, audio and video downloading, internet access and browsing, short range communications such as Bluetooth™, mobile banking, instant messaging and the ever-popular specialized ringtones.

To maximize a customer's user experience, a particular application may need to determine the location and status of a mobile device, control a mobile device's functionality, and send and retrieve data from a particular mobile device. For example, some mobile devices can be configured such that the current physical location of the device as well as its current status, such as being on, off, in standby, or in use can be determined and then the functionality of the mobile device can be controlled to better serve the user. Such abilities enable applications that provide users with time, location, use, and functional specific services and capabilities, for example, advertising, games, social networking, navigation assistance, points of interest, and consumer and business-related services.

While mobile device users can and have benefited from location-specific services there are other services that are useful based on "user activities." For example, some services are particularly useful when a user is performing a particular activity such as driving or when actually using a communication device. This ability has opened up the possibility of "user activity" based applications that perform activity-specific services and/or that can automatically configure a mobile device's functionality based on use.

However, the difficulty of actually controlling the wide range of different mobile devices on different networks, retrieving data from those mobile devices, and then determining locations, status, or user activities can become so complex that some otherwise worthwhile applications may simply not be cost effective to implement. However, with over 4 billion mobile devices in existence the demand for more, better, and specialized applications is extensive and growing.

One approach to addressing the complexity of providing users with applications that can take advantage of mobile devices having different features on different communication networks, as well as in different locations and in different operating statuses, is disclosed in U.S. patent application Ser. No. 13/217,093, entitled "System and Method for Enabling Control of Mobile Device Functional Components," which was filed on Aug. 24, 2011. That patent application is hereby incorporated by reference in its entirety as if fully disclosed herein.

While the teachings of U.S. patent application Ser. No. 13/217,093 are highly useful and beneficial, some applications may demand even more control of the mobile devices they run on than is provided by the teachings of that application.

SUMMARY

The principles of the invention provide for a method and system which facilitates the development and maintenance of applications for mobile devices that make use of historical patterns of operation, while also enabling addressing issues of complexity in mobile device control and data collection.

A communication network in accord with the invention includes a mobile device having communication capability and a function that is dependent on a user activity, such as driving or using the mobile device. A server with a communication capability includes activity detection logic for detecting the user activity based on the function. The server further includes a data collection unit that collects and compiles a digital histogram of the user activity, which is stored in a stored histogram database. The server further includes a polling mechanism that directs the activity detection logic to detect the user activity based on the stored histogram.

Another communication network that is in accord with the invention includes a mobile device having communication capability and a function that is dependent on a user activity, such as driving or using the mobile device. A client state manager with a communication capability communicates with a server having activity detection logic for detecting the user activity based on the function. The server reports the user activity back to the client state manager that collects and compiles a digital histogram of the user activity, which is stored in a stored histogram database. The client state manager further includes a polling mechanism that directs the server and its activity detection logic to detect the user activity based on the stored histogram.

The user activity is beneficially either driving or using the mobile device. The stored histogram can be "fixed" in which case it keeps track of all user activity from an initial start time, or rolling, in which case old data is discarded. Preferably the stored histogram tracks the user activity over either a 24 hour or 1 week interval. Ideally there are four histograms, two for driving, one a 24 hour histogram the other a week histogram, and two for mobile device usage, one a 24 hour histogram the other a week histogram.

The communication network might further incorporate an application that depends on the user activity. By polling the user activity based one or more histograms, the application can provide a better user experience by better sensing the user activity based on previous activity at this time of day or week.

The invention can be incorporated as coded instructions in computer readable storage media. Such media can implement stored client states that indicate the statuses of functional components of a mobile device. Each client state can correspond to at least one functional component. That media can further implement a digital histogram of client state activity with the histogram indicating the status of a client state activity over time.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENT(S)

The disclosed subject matter will now be described more fully hereinafter with reference to the accompanying drawings. However, it should be understood that this invention may take many different forms and thus the invention should not be construed as being limited to the specific embodiments set forth herein.

In the figures like numbers refer to like elements. Furthermore, the terms "a" and "an" as used herein do not denote a limitation of quantity, but rather denote the presence of at least one of the referenced items. All documents and references referred to in are hereby incorporated by reference for all purposes.

Figure 1:
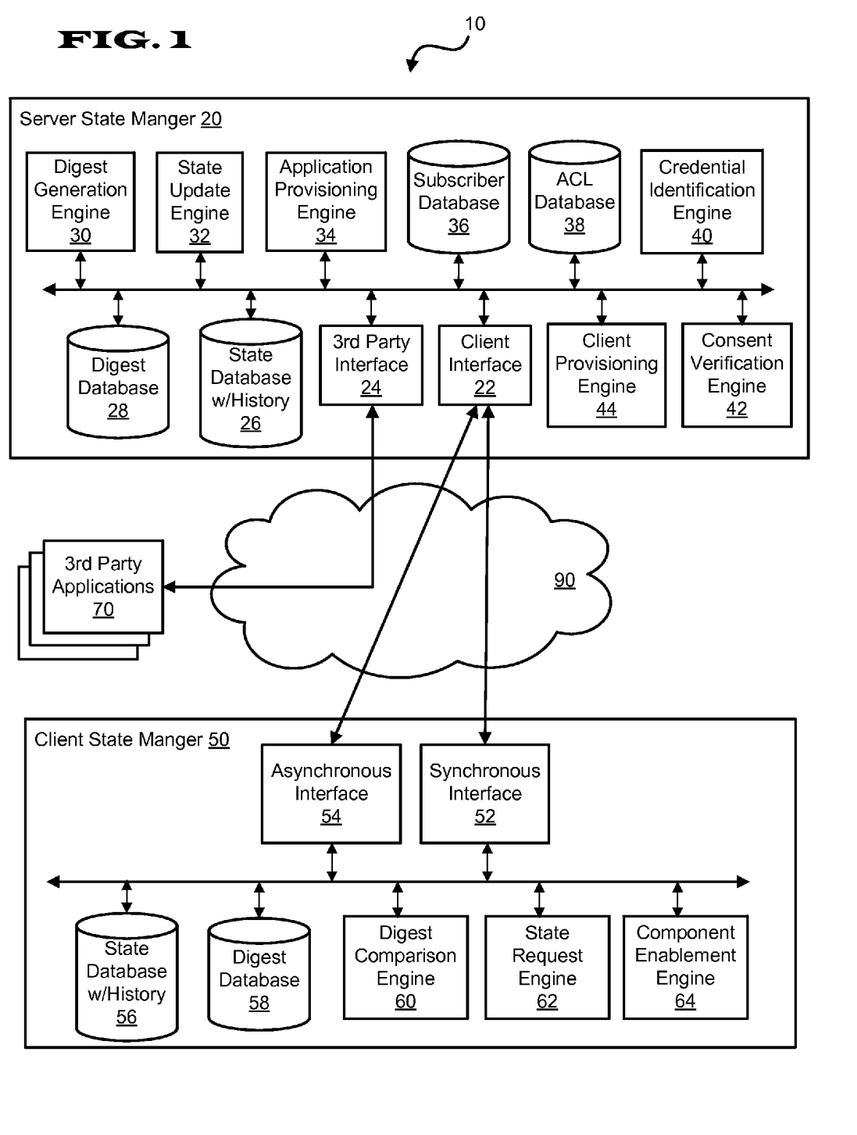
FIG. 1 shows an operating environment topology, including a server state manager, a client state manager, and a third party application that incorporates the principles of the invention.

Refer now to FIG. 1, which is a schematic illustration of an exemplary operating environment 10 suitable for incorporating the principles of the invention. The operating environment 10 includes a server state manager 20 that functions within a communications network 90. The communications network 90 preferably includes at least one wireless network and possibly at least one wired network that provide communication capabilities for the devices in the operating environment 10. The server state manager 20 is preferably implemented on a network server using one or more processing units, hardware components, and software components as required.

Still referring to FIG. 1, the server state manager 20 includes a client interface 22 and a third party interface 24. The client interface 22 communicates with at least one client state manager 50 via an internal synchronous interface 52 and an asynchronous interface 54. The client interface 22 preferably implements a Representational State Transfer styled application program interface ("RESTful API"). The server state manager 20 exposes various functional components of the client state manager 50 to at least one participating third party application 70 via the third party interface 24 using another RESTful API. Alternatively, other suitable application program interface architecture might be leveraged for server state manager communications.

In practice the server state manager 20 services a plurality, possibly a very large number, of different client state managers. For convenience, when a particular client state manager is being referred to, it will be referred to as the client state manager 50, while when any client state manager or all state client managers are being referred to, it or they will be simply referred to as a client state manager. As with client state managers, the server state manager 20 may interface and operate with a plurality, possibly a very large number, of third party applications, including multiple versions of the same application. Again, when a particular third party application is being referred to, it will be referred to as the third party application 70, while when any third party application or all third party applications are being referred to, it or they will be simply referred to as a third party application.

Figure 2:
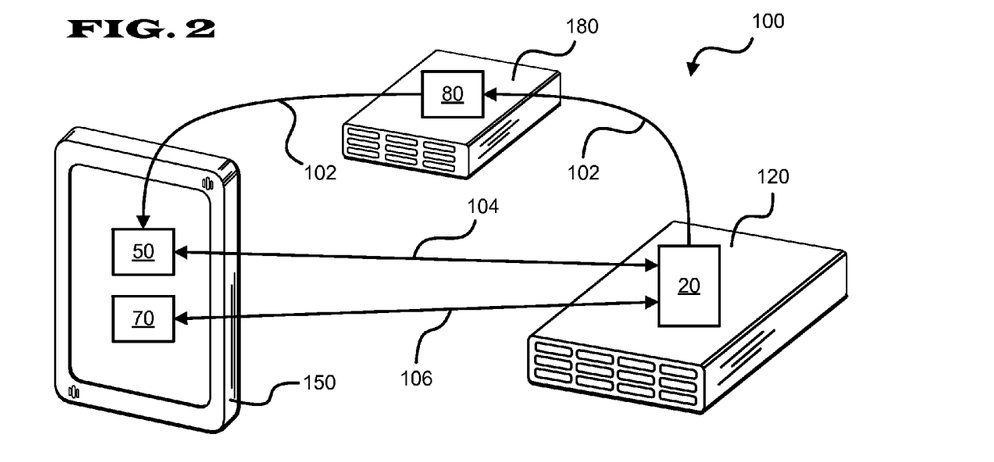
FIGS. 2 and 3 depict prototypical implementations of the client state manager and the server state manager of FIG. 1.
Figure 3:
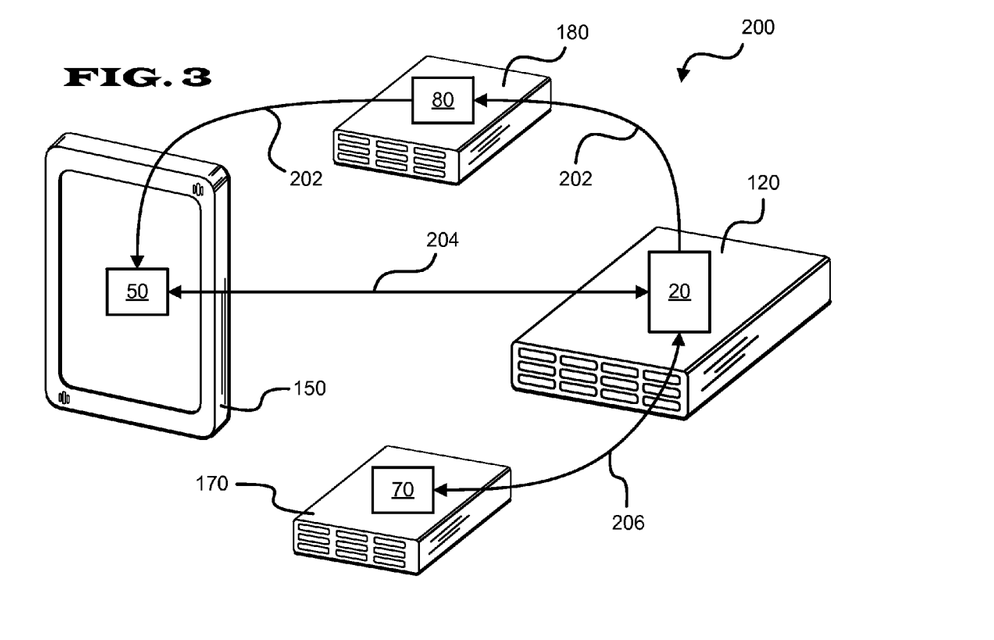

Referencing now FIGS. 1, 2, and 3 as required, the client state manager 50 is preferably implemented via encoded instructions on a mobile device 150, which preferably includes cellular telephone transmitting and receiving functionality. The encoded instructions can be hardware or software enabled. The third party application 70 may reside on the same mobile device 150 as the client state manager 50 (reference FIG. 2), or the third party application 70 may reside on a separate system 170 which communicates with the server state manager 20 via the communications network 90 (reference FIG. 3).

Referring now primarily to FIG. 1, the client state manager 50 includes a functional component enablement engine 64 that enables and disables various functional components of the mobile device 150. Those functional components preferably include software or hardware driven features, settings, capabilities and resources. Different mobile devices may implement different client state managers having different functional components or may implement the same functional component but in a different way.

The server state manager 20 includes a server state with history database 26 that stores states that indicate the statuses of various functional components of each mobile device in communication with the server state manager 20, specifically including the mobile device 150 that implements the client state manager 50. The statuses of the functional components of the mobile devices may indicate whether a particular functional component of a mobile device is enabled or disabled, or may indicate one or more scheduled time periods when a particular functional component is enabled or disabled. Significantly, the statuses of the functional components can include particular sets of modifiable parameters.

The server state with history database 26 also includes historical information regarding the operating activities of the mobile device 150. For example, the server state with history database 26 can contain a digital history of the times at which the user of the mobile device 150 is driving or the times at which the mobile device 150 is being used. That historical information is beneficially implemented in a database that corresponds to a modified histogram of the functional states of the mobile device 150. Such a histogram is described in more detail subsequently.

Still referring to FIG. 1, the server state manager 20 also includes a server digest database 28 that stores a status digest for each of the functional states. Each digest is preferably determined via a hash function that is applied to elements of a respective state by a digest generation engine 30.

Turning now to the client state manager 50 shown in FIG. 1, the client state manager 50 includes a client state with history database 56 which stores the statuses of the functional states of the mobile device 150 as well as historical information regarding the operating activates of the mobile device 150 as well as a client digest database 58, which stores digests corresponding to the stored states. In practice, the functional states and historical information and the digest are received from the server state manager 20. For the purpose of clarity, states, histories, and digests corresponding to a particular mobile device 150 and stored by the server state manager 20 are respectively termed "server states", "server histories" and "server digests", and states, histories, and digests received from the server state manager 20 and stored by the client state manager 50 are respectively termed "client states", "client histories" and "client digests".

The server state manager 20 is configured to receive from the third party application 70 via the third party interface 24 a request to modify the status of one or more functional components of the particular mobile device 150 that implements the client state manager 50. That third party application 70 may be implemented such that actually modifying the status of one or more functional components of the particular mobile device 150 depends on the historical information of that mobile device 150. For example, the third party application 70 can seek to automatically switch to hands-free operation if the user of the mobile device 150 is usually driving at a specific time during the day. The historical information in the client state with history database 26 can be used to determine how often a determination is made as to whether the user is driving at a particular time.

A request to modify a functional component status can come as a preference indication, for example "turn on mobile device location streaming" or "turn off mobile device location streaming" or "switch to hands free operation" or "switch from standby to active operation." A request may also include a modification of one or more parameters of a functional component, and how often that modification is made can depend on the historical information regarding operational activities of the mobile device 150.

In response, the server state manager 20 uses a state update engine 32 to update one or more server states that correspond to one or more functional components. When a particular server state is updated, a corresponding server state digest 28 is updated via the digest generation engine 30. In practice, a particular functional component can be related to other functional components (discussed in more detail subsequently). In such cases an application's request to modify the status of a particular functional component would trigger updates of the state database and digest database not only for the particular functional component but for the related functional components as well.

In response to server state with history database 26 and server digest updates, updated server digests are transmitted from the server state manager 20 via the client interface 22 to the mobile device 150 implementing the client state manager 50. Beneficially the server state manager 20 transmits updated server digests to the mobile device 150 via asynchronous communications using the asynchronous interface 54 and a Short Message Service ("SMS") protocol. The client state manager 50 compares the received server digest with its client digest using the digest comparison engine 60. If a difference is detected a state request corresponding to the difference is generated by a state request engine 62. The generated state request is then transmitted to the server state manager 20 via its client interface 22.

State requests are preferably sent by the client state manager 50 using synchronous communication via the synchronous interface 52. A typical protocol is the Hypertext Transfer Protocol Secure ("HTTPS"). The server state manager 20 then transmits via its client interface 22 a server state that is responsive to the received state request using synchronous communication, preferably using the same protocol.

The newly transmitted server digest might be the same server digest previously transmitted to the client state manager 50, or if the server state with history database 26 has been re-updated since the corresponding server digest was sent a re-updated server state with history can be transmitted to the client state manager 50. The server state with history is preferably transmitted along with the corresponding current digest using synchronous communication. The newly received state and digest are stored in the respective client state with history database 56 and client digest database 58. Beneficially the history component in the client state with history database 56 is not changed.

Transmitting the most current digest in the synchronous communication is important since it is possible that the particular server state, and corresponding server digest may have been re-updated by the state update engine 32 since the updated digest was transmitted to the client state manager 50. Further, additional server digests corresponding to functional components related to the particular functional component can be transmitted with the state and digest of the particular functional component responsive to the state request. Thereafter, the client state manager's digest comparison engine 60 compares each received additional server digest with its corresponding client digest and transmits another state request if a difference is determined between an additional server digest and its corresponding client digest, and the server state manager 20 thereafter returns one or more states corresponding to the new state request.

The client state manager 50 uses the functional component enablement engine 64 to enable or disable a functional component as indicated by the received corresponding server state. The newly received server state is stored by the client state manager 50 as the corresponding client state in the client state with history database 56, preferably overwriting the existing corresponding client state. Similarly, the newly received server digest is stored by the client state manager 50 as the corresponding client digest in the client digest database 58, preferably overwriting the existing corresponding client digest. Once again the history component in the client state with history database 56 is beneficially not changed.

Refer now once again to FIG. 2, wherein an implementation 100 of a network of devices suitable for practicing the invention is shown. The third party application 70 resides on the mobile device 150 on which the client state manager 50 is implemented. The server state manager 20 is implemented on a state server 120. A message aggregation server 180 executing a message aggregator 80, for example a Short Message Service ("SMS") aggregator or Short Message Service Center ("SMSC"), disseminates asynchronous communications 102, for example SMS messages, from the server state manager 20 to the client state manager 50, for example via a wireless telecommunications network. Synchronous communications 104, 106, for example implementing HTTPS through a data network, are initiated between the client state manager 50 and the server state manager 20 and between the third party application 70 and the server state manager 20, respectively.

Refer now once again to FIG. 3 wherein another implementation 200 of a network of devices suitable for practicing the invention is shown. In implementation 200 the third party application 70 resides on a separate application server 170 that is in communication with the server state manager 20 on the state server 120, for example via a data network. The message aggregation server 180 disseminates asynchronous communications 202, for example SMS messages, from the server state manager 20 to the client state manager 50 implemented in the mobile device 150. Synchronous communications 204, 206 are initiated between the client state manager 50 and the server state manager 20 and between the third party application 70 and the server state manager 20, respectively.

Functional components can include a mobile device's software or hardware driven features, settings, capabilities and resources. Examples of functional components are presented in Tables 1-5 which respectively show example features, capabilities, settings, resources, and parameters which can be set for particular features and capabilities. Some of the functional components can be enabled and disabled by the functional component enablement engine 64 of the client state manager 50 on a particular mobile device 150.

TABLE 1

| No. | Feature |
| --- | --- |
| F1 | Location data access |
| F2 | Short message service ("SMS") access |
| F3 | Multimedia messaging service ("MMS") access |
| F4 | Voice call access |
| F5 | Global positioning system ("GPS") access/control |
| F6 | Applications control |
| F7 | Contact access |
| F8 | Device interface locking control |
| F9 | Communication with device user |

TABLE 2

| No. | Setting |
| --- | --- |
| S1 | Networking retry time interval |
| S2 | Networking maximum number of retries |
| S3 | GPS timeout time |
| S4 | GPS maximum acceptable precision |
| S5 | Device interface locking triggering driving speed |
| S6 | Device interface locking triggering minimum travel distance |
| S7 | Mobile device heartbeat time interval |
| S8 | Network location timeout time |

TABLE 3

| No. | Capability | Parent Feature |
| --- | --- | --- |
| C1 | Location Streaming | F1 (Location data access) |
| C2 | On demand location requesting | F1 |
| C3 | Gathering incoming SMS activity | F2 (SMS access) |
| C4 | Gathering outgoing SMS activity | F2 |
| C5 | Gathering incoming MMS activity | F3 (MMS access) |
| C6 | Gathering outgoing MMS activity | F3 |
| C7 | Gathering incoming voice call activity | F4 (Voice call access) |
| C8 | Gathering outgoing voice call activity | F4 |
| C9 | Detection of whether GPS is on or off | F5 (GPS access/control) |
| C10 | Forcing GPS on if off | F5 |
| C11 | Reporting of installed applications on client | F6 (Applications control) |
| C12 | Reporting of contacts | F7 (Contact access) |
| C13 | Locking interface based on time schedule | F8 (Device interface locking control) |
| C14 | Locking interface based on driving | F8 |
| C15 | Screen Messaging | F9 (Communication with device user) |

TABLE 4

| No. | Resource | Parent Feature |
| --- | --- | --- |
| R1 | Main text for lock screen | F8 |
| R2 | Message text for lock screen | F8 |
| R3 | Auto reply text for lock screen | F8 |
| R4 | Override text for lock screen | F8 |
| R5 | Emergency text for lock screen | F8 |
| R6 | Background image for lock screen | F8 |
| R7 | Branding image for lock screen | F8 |
| R8 | Message regarding subscriber privacy | F9 |

TABLE 5

| No. | Parameter | Parent Feature/ Capability |
| --- | --- | --- |
| P1 | Which mobile applications can run or be launched while interface is locked (e.g. a music playing application) | F8, C13, and C14 |
| P2 | Which phone numbers can interface-locked device continue to place calls to or receive calls from | F8, C13, and C14 |
| P3 | Which phone numbers can interface-locked device continue to receive messages (e.g. SMS) from | F8, C13, and C14 |
| P4 | Whether a hands free device connected to the interface-locked device (e.g. Bluetooth headset) can be used to place phone calls | F8, C13, and C14 |
| P5 | Whether an auto reply message is sent to a user/device sending a message (e.g. SMS) to the interface-locked device | F8, C13, and C14 |
| P6 | Message content | C15 |
| P7 | URL link associated with message | C15 |
| P8 | Whether to launch device web browser and connect to URL responsive to interaction with message | C15 |

Figure 4:
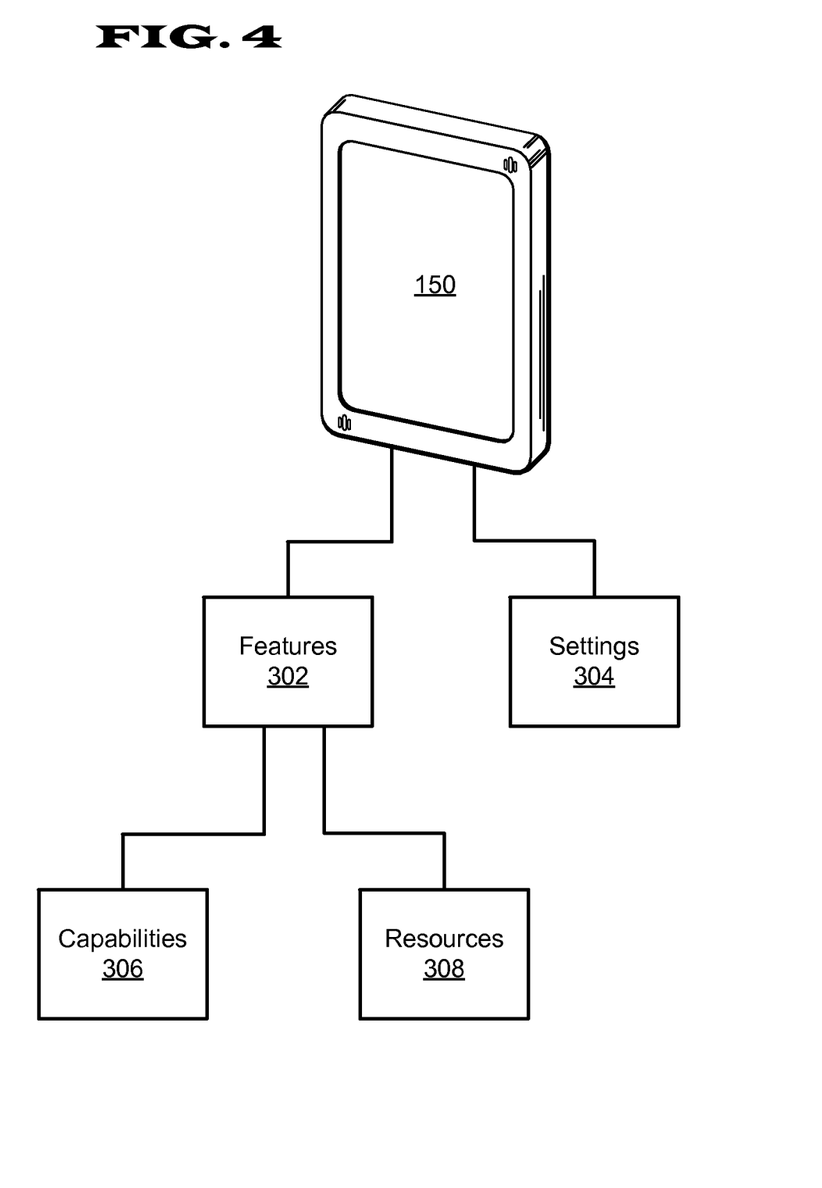
FIG. 4 depicts prototypical functional components that may be supported by a particular mobile device implementing the client state manager of FIG. 1.

As previously indicated, some functional components are interrelated to the extent that modification of the status of a particular functional component may result in modification in the status of one or more related functional components. Referring now specifically to FIG. 4 and Tables 1-4, a particular mobile device 150 can be enabled, for example with features 302, settings 304, capabilities 306 and resources 308. Particular features 302 are related to particular capabilities 306 and particular resources 308. Modification of the status of a particular capability 306 or particular resource 308 may result in modification of the status of a particular feature 302 or vice versa. Mobile device user-specific data ("subscriber-specific data"), for example mobile device location data or operational state data or possibly historical information, is disseminated by a mobile device 150 based on the status of the capabilities 306. That data is stored in a subscriber database 36 in the server state manager 20 for dissemination to an authorized third party application 70.

Figure 5A:
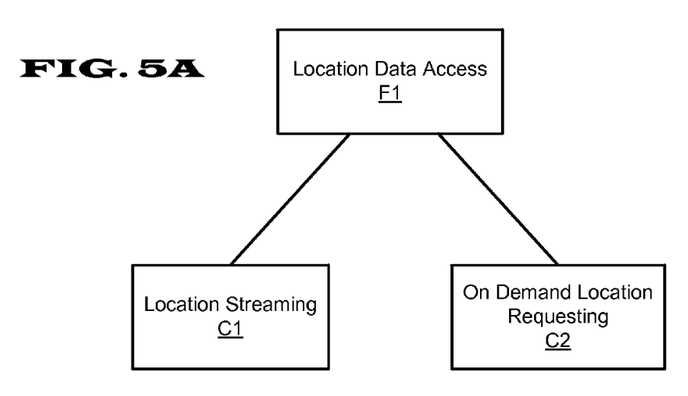
FIGS. 5A and 5B are diagrams depicting relationships between example functional components supported by a particular mobile device implementing the client state manager of FIG. 1.

One example of the interrelated functions is shown in FIG. 5A. Capabilities C1 (location streaming) and C2 (on demand location requesting), are related to feature F1 (location data access). A change in status of feature F1 can result in a change in status and histories of capability C1 or C2, or alternatively a change in status of capability C1 or C2 results in a change in the status and history of feature F1. For example, a request from a third party application 70 to the client state manager 50 to enable or disable feature F1, immediately or during a scheduled time period or based on historical information regarding feature F1, causes the client state manager 50 to direct the server state manager 20 to update the server states and server digests of feature F1 and capabilities C1 and C2 to reflect that features F1 and capabilities C1 and C2 are enabled or disabled. In another example, a request from a third party application 70 to the server state manager 20 via the third party interface 24 to disable location streaming capability C1 causes the state update engine 32 to update the server state of capability C1 and causes the digest generation engine 30 to update the server digest of capability C1. The request further causes the server state manager 20 to update the server state and server digest of the location data access feature F1.

Figure 5B:
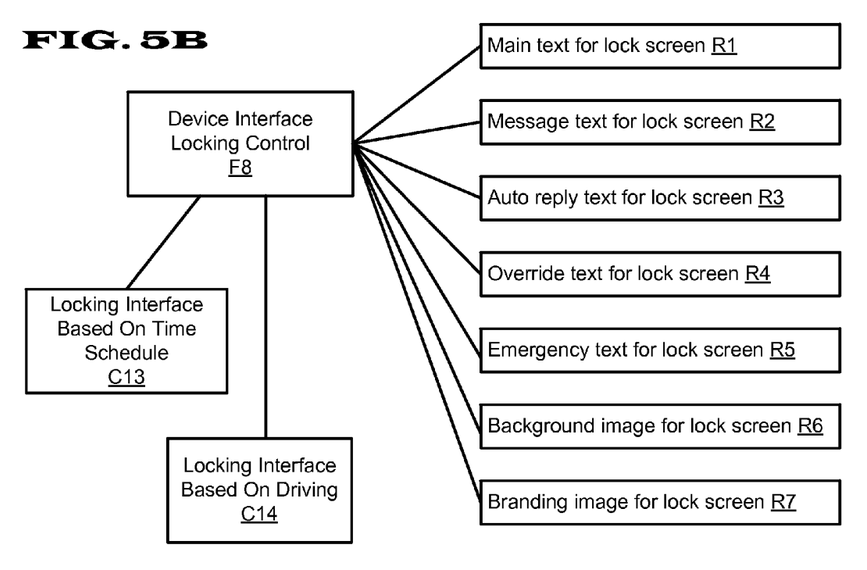

Another example is shown in FIG. 5B. Capabilities C13 (Locking interface based on time schedule) and C14 (Locking interface based on driving), and resources R1-R7 are related to feature F8 (Device interface locking control). A change in status of feature F8 can result in a change in status of capability C13 or C14, or alternatively a change in status of capability C13 or C14 results in a change in status of feature F8. For example, a request from a third party application 70 to enable or disable the device interface locking control feature F8, immediately or during a scheduled time period or based on historical patterns, causes the server state manager 20 to update the server states and server digests of feature F8 and capabilities C13 and C14 to reflect that feature F8 and capabilities C13 and C14 are enabled or disabled. In another example a request from a third party application 70 to lock the mobile device interface during a particular time period or during an activity such as driving via capability C13 causes the state update engine 32 to update the server state of capability C13 and causes the digest generation engine 30 to update the server digest of capability C13. The request further causes the server state manager 20 to update the server state and server digest of the device interface locking control feature F8. In addition the client state manager 50 updates the history of the user activity.

Figure 5C:
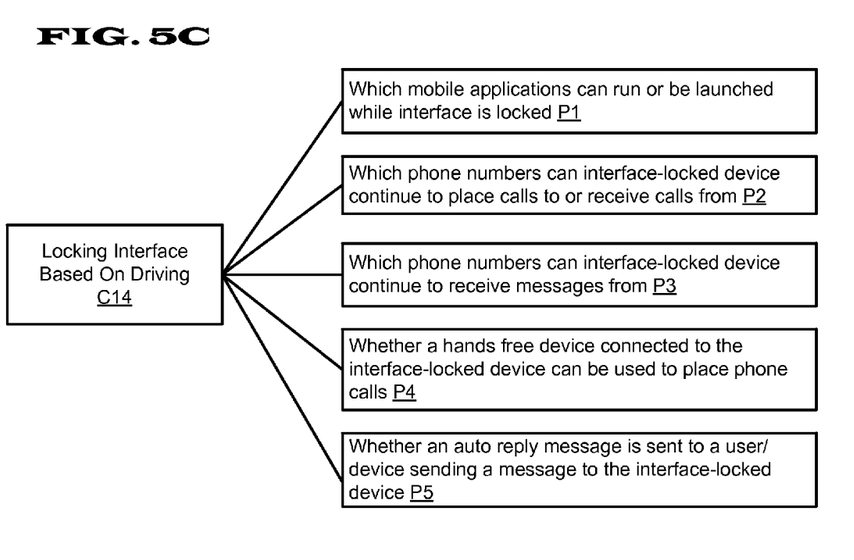
FIGS. 5C and 5D are diagrams depicting relationships between example functional components and related parameters supported by a particular mobile device implementing the client state manager of FIG. 1.
Figure 5D:
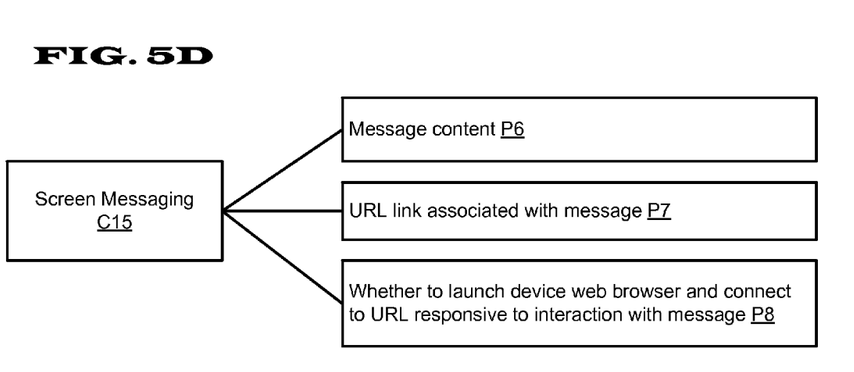

Referring now to Table 5 and FIGS. 5C and 5D, particular enabled features and capabilities allow setting of parameters by a third party application. For example as shown in FIG. 5C, a third party application enabling the locking interface based on driving capability C14 can set: 1) parameter P1 to select applications which can run when device interface is locked, 2) parameter P2 to select phone numbers which interface-locked device can continue to place calls to or receive calls from, 3) parameter P3 to select phone numbers from which the interface-locked device can continue to receive messages (e.g. SMS) from, 4) parameter P4 to select whether a hands free device connected to the interface-locked device (e.g. Bluetooth headset) can be used to place phone calls, and 5) parameter P5 to select whether an auto reply message is sent to a user/device sending a message (e.g. SMS) to the interface-locked device.

As shown in Table 5, parameters P1 through P5 are also applicable to capability C13, locking interface based on time schedule, and feature F8, device interface locking control. As shown in FIG. 5D, a third party application enabling the screen messaging capability C15 can set: 1) parameter P6 to specify message content, 2) parameter P7 to specify a URL link associated with a specified message, and 3) parameter P8 to select whether to launch a device web browser and connect to a specified URL responsive to user interaction with a specified message (e.g. user clicking on message).

The principles of the invention relate to collecting and using historic information regarding the operation of the mobile device 150 and the activities of the user of that mobile device 150. For example, an operation of the mobile device 150 might be a user using a screen while an activity of the user might be driving a vehicle. Those principles enable the focusing of applications to users based on historical information.

Figure 6:
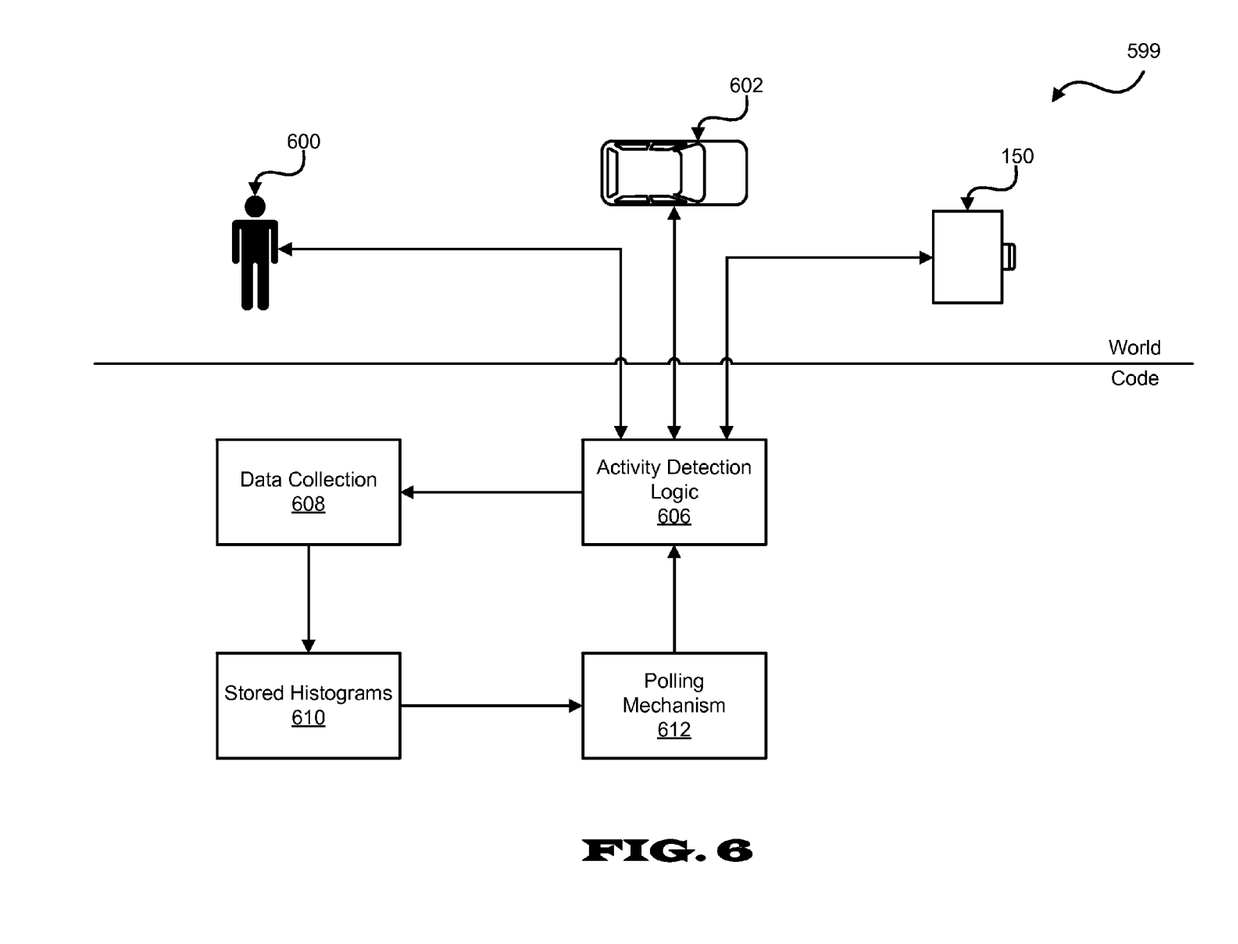
FIG. 6 illustrates a topology of a user environment suitable for implementing the principles of the invention.

FIG. 6 shows a prototypical topology suitable for practicing the principles of the invention. Consider an application 70 (see FIGS. 1-3) that supports a user 600 of the mobile device 150 when the user 600 is driving a vehicle 602. That application 70 has little utility when the user 600 is sleeping or is at work or is having dinner. However, determining whether a particular user is or is not driving is not trivial, particularly when the server state manager 20 is serving a large number of mobile devices. To do so the application 70 directs the client state manager 50 to have the server state manager 20 run an activity detection logic program 606 that determines the particulars of the current activity of the user 600. To determine whether the user 600 is currently driving the mobile device 150 is polled and a number of signal sources are examined, such as the cell signal, WiFi connection, and accelerometer data to determine if the GPS (global positioning system) can be run. If the GPS can be run, the instantaneous speed of the mobile device 150 is found from the GPS hardware. Based on the instantaneous speed a determination is made as to whether the user 600 is driving a moving car (or is at least in a car, bus, train, etc.).

The foregoing scheme of using instantaneous speed to determine whether a user 600 is driving works great in places like central Kansas, but maybe not so well in Los Angeles, San Jose, San Francisco, Washington D.C., Houston, or any other city that suffers traffic jams. During certain time periods in certain places of such cites the average rate of travel during rush hour may be less than walking. Proprietary schemes may be incorporated to determine whether a user 600 is or is not driving. Some of those proprietary schemes can make use of historical patterns of user 600 activity. That is, if the user 600 is usually or often driving during a time period an application 70 may frequently poll the mobile device 150 to determine whether the user 600 is driving.

To be useful, historical patterns of user activity must be collected and compiled in a manner that can be stored, searched, and used. Examples of such actions are depicted in FIG. 6. Software implements code that includes the activity detection logic 606 that obtains data related to user 600 activities and a data collection unit 608 that collects the data from the activity detection logic 606. That collected data is then compiled into a collection of stored histograms 610 of user activities that represent frequency of occurrences of different user activities over different time spans. A polling mechanism 612 can then make use of the stored histograms 610 to cause the activity detection logic 606 to poll the user

600, based on the frequency of occurrence of an activity, to determine its current activities.

For example, if a driving event is occurring when the activity detection logic 606 polls the user 600, the activity detection logic 606 determines that the user 600 is driving the vehicle 602. That determination, along with the current time is sent to the data collection unit 608 which adds the driving activity and time into a stored histogram related to driving. Similarly, whenever a user 600 turns on (or off) the screen on their mobile device 150 the activity detection logic 606 senses that the user 600 has turned on (or off) the screen, the time is determined, and the activity and time is sent to the data collection unit 608 which adds the on (or off) activity and time into a stored histogram related to phone usage.

As used herein a stored histograms 610 is a database of a variable (a user activity such as driving or using a phone) over time that is useful for estimating the probability of the underlying variable (activity) occurring during different time intervals. That is, how likely the variable will occur in or over a particular time period. Such a histogram is a digital version of a plot of density verses time data.

Figure 7:
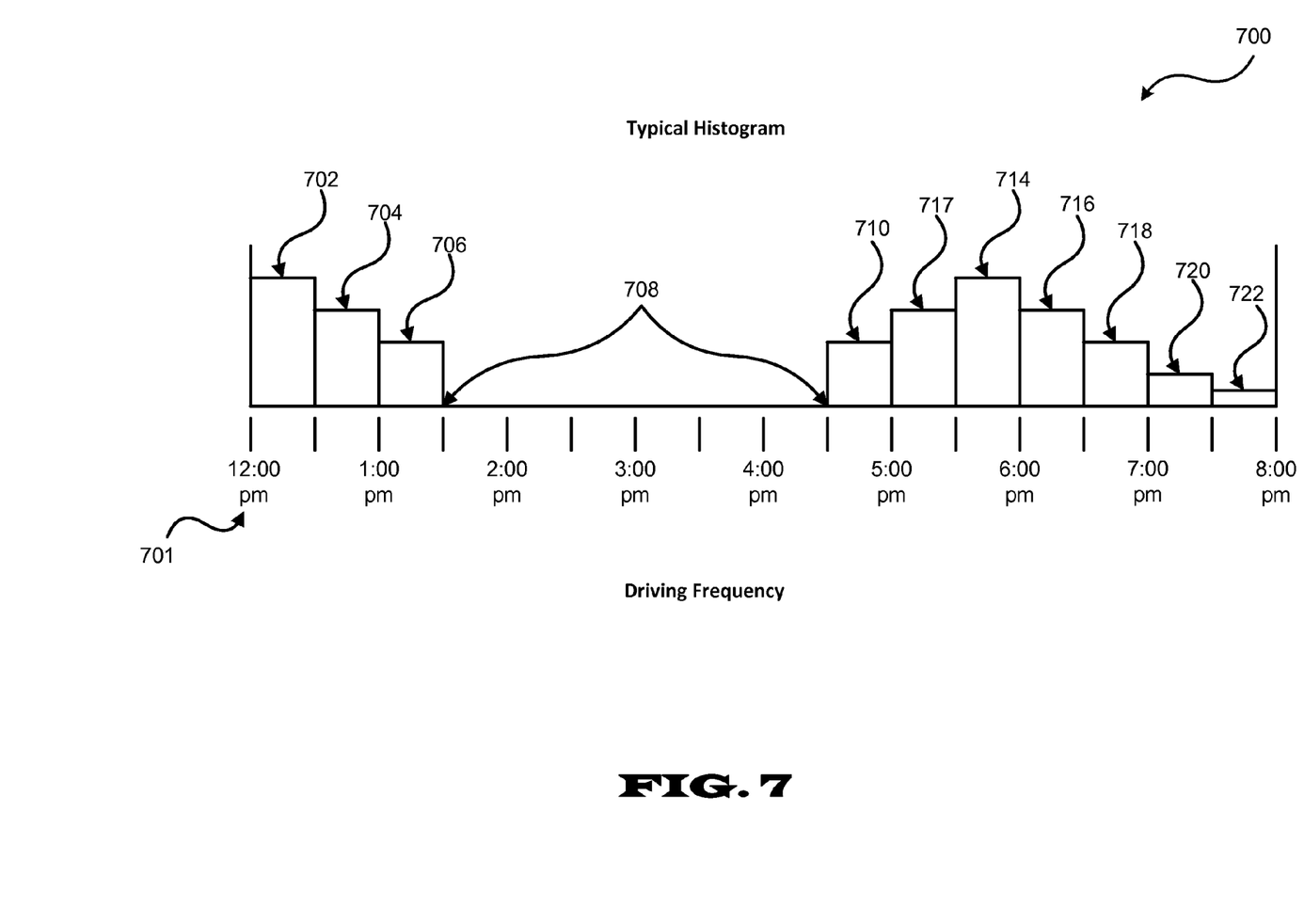
FIG. 7 depicts a graph of a prototypical histogram of driving frequency which is suitable for use in the invention.
Figure 8:
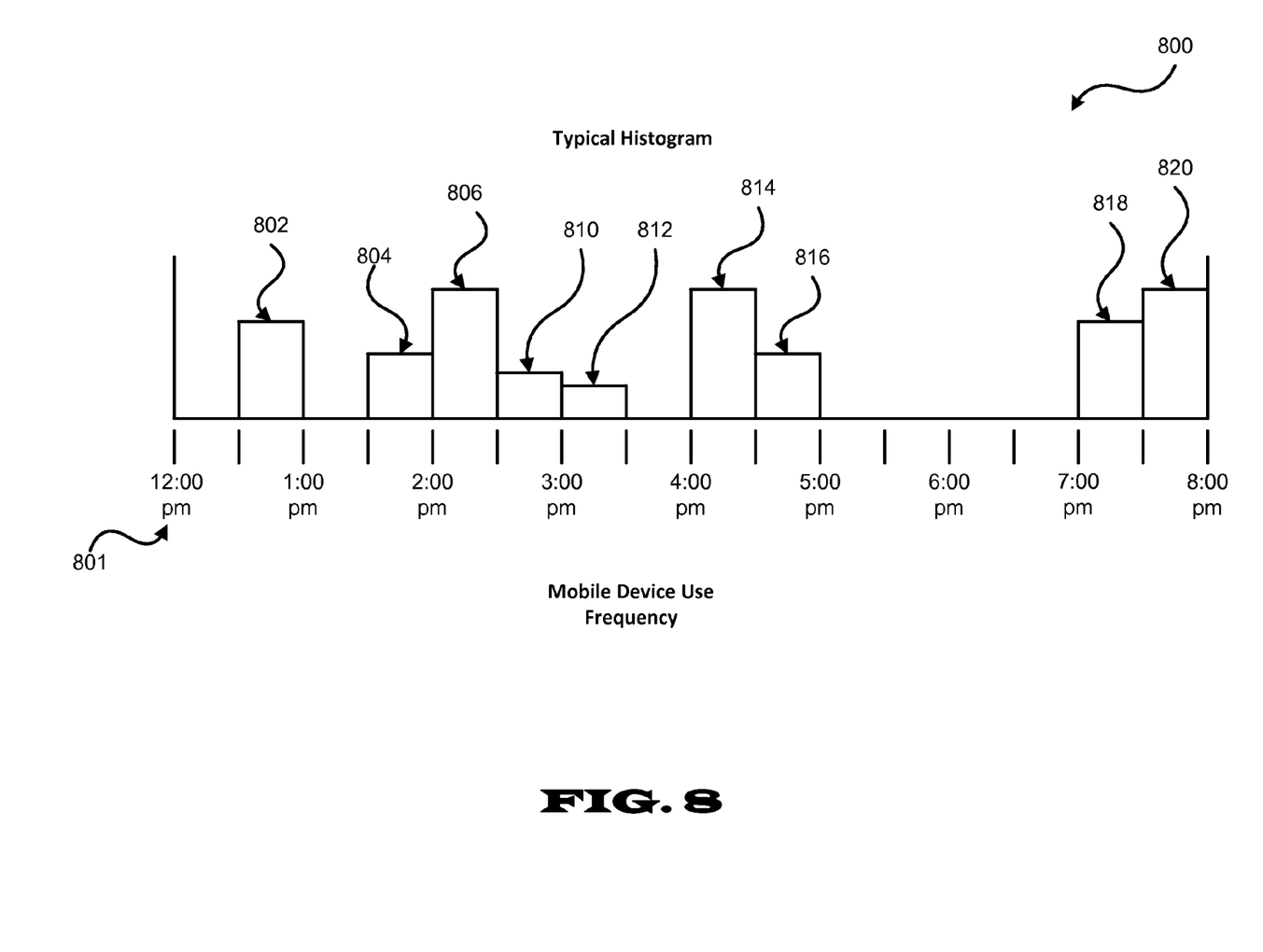
FIG. 8 depicts a graph of a prototypical histogram of mobile device usage which is suitable for use in the invention.

FIG. 7 presents a human readable version of a histogram 700 of a user's driving activity. The X-axis 701 represents time divided into a plurality of intervals 702-722, each interval being a half-hour (708 represents a plurality of intervals). FIG. 8 presents a human readable version of a histogram 800 of a user's mobile device usage activity. The X-axis 801 again represents time divided into a plurality of intervals 802-820. The Y-axis represents a value related to the number of occurrences of the variable in each interval, driving in FIG. 7, and mobile device usage in FIG. 8.

Typically "histograms" are configured such that the total area of the histogram is normalized to 1, while the lengths of the intervals along the X-axis are all 1 (equal). Such histograms provide a relative frequency plot of the occurrence of the variable in each interval. A stored histogram 610 in accord with the invention is a modified version of the typical histogram, but it still provides information related to the likelihood of the occurrence of the variable in a time interval. Differences include the fact that the X-axis time intervals may not be the same (although depending on the application 70 they might be) and that there is no need to normalize the total area to 1 (although depending on the application 70 it might be).

Referring again to FIGS. 7 and 8, the histograms show a visual representation of digital stored histograms 610 (see FIG. 6) over a time period starting at 12:00 PM and running to 8:00 PM. Preferably there are digital stored histograms 610 for a 24 hour period and for a week for both driving (FIG. 7) and mobile device usage (FIG. 8). However, different implementations might keep histograms for each day of a week, over a fortnight, daily per month, or other suitable time period. Furthermore, the half-hour time period shown in FIGS. 7 and 8 is simply for convenience of explanation. A stored histogram 610 can use different time periods, such as minutes, 5 minute intervals, quarter hours, and can in fact use "unequal" time periods. For example, between 1:00 AM and 6:00 AM the time periods may be hour long, while from 6:00 AM to 9:00 AM they may be kept in 5 minute intervals.

Referring now to FIGS. 6 through 8, each time interval represents a "time bin," and thus each stored histogram 610 will have some number of time bins. When the activity detection logic 606 polls the user 600 and determines that a user activity is taking place (driving in FIG. 7, mobile device usage in FIG. 8) the data collection unit 608 determines the time of the polling event, for example 12:30. When the next polling event takes place the data collection unit 608 determines the time of that polling event, for example 1:00, and also determines whether the user is found to be still performing the user activity (driving/using the mobile device). If the user activity (driving/mobile device usage) is still occurring and if the two polling times completely span a time bin, as it does in this example, the data collection unit 608 adds "1" to the time bins spanned by the polling times, here the time bins 704 and 802.

However, if the polling times only partially span a time bin, then the value added to the partially spanned time bin is scaled to indicate the amount of coverage present. For example, referencing FIG. 7, assume that at 12:00 PM the activity detection logic 606 polls the user 600 and determines that a user activity is taking place (specifically driving). Then at 12:05 the activity detection logic 606 polls the user 600 and determines that the user activity is still taking place. This continues at 5 minute intervals until at 12:20 the activity detection logic 606 polls the user 600 and determines that the user activity is not taking place (the user 600 is no longer driving). In that case the data collection unit 608 adds "0.5" (or, depending on the programming, 0.67) to time bin 702 that covers the polling times.

In practice there are preferably two different kinds of stored histograms 610: fixed and rolling. A fixed stored histogram contains an absolute history of all variables since a given start time. New events are scaled proportional to the amount of data already in the stored histogram. Using this approach old activity is not forgotten but its relevance is diminished. A rolling stored histogram contains only 'n' time bins worth of data while older data is thrown out. New data always has the same weight as previous data did while old data is discarded.

Rolling stored histograms are in some ways more useful than fixed stored histograms because they better reflect "recent" user activities. A problem exists with rolling histograms in that when they are first created there is no "past" data to meld with new data. However, rolling stored histograms can be initialized to incorporate reasonable initial assumptions of a user's activity. This has the advantages that the new data is not given undue precedence while still enabling learning of a user's actual activity behavior over time.

Rolling stored histograms are beneficially initialized based upon "guesses" as to what the most common behavior is. For example, from 12:00 to 6:00 AM an assumption can be made that the user 600 is asleep. In that case the mobile device 150 is placed in an initial state and the polling mechanism 612 causes the activity detection logic 606 to apply default polling intervals that were defined apriori.

Since the polling intervals of some histogram-tracked activities will depend on a user's activity history, and since without an actually history the default polling intervals might be used until a sufficient user activity history is determined. For example, a default might assume that between 11:00 PM and 6:00 AM that a user 600 is sleeping. Then, the default might assume that from 6:00-7:00 AM a user 600 is getting ready for work, from 7:00 to 8:00 AM the user 600 is driving to work, from 8:00 AM to 5:00 PM the user 600 is at work, from 5:00 to 6:00 PM the user 600 is driving home, from 6:00 to 7:00 PM the user is eating, from 7:00 to 10:00 PM the user 600 is on the computer, and from 10:00 to 11:00 PM the user 600 is watching television.

The default assumptions may or may not match up with actual user activities of the user 600. The purpose of the activity detection logic 606, the data collection unit 608, the stored histograms 610, and the polling mechanism 612 is to learn the activities of the user 600 over time and then to make use of that learning to enhance the user experience of user 600. If the user 600 is a heavy user of the mobile phone 150, the learning may be quick. For example, if the user 600 usually commutes to work between 9:00 and 10:30 instead of the default assumption of 7:00 to 8:00 AM, polling of the mobile device 150 between 7:00 and 8:00 AM will not add to the driving histogram while polling between 9:00 and 10:30 will. Additional polling between 9:00 and 10:30 will soon overwhelm the default assumption. Likewise, if the user 600 normally works between 10:00 AM and 6:00 PM and uses the mobile device 150 from time to time that will also be learned. If the user 600 commutes home between 6:00 and 7:30 PM this will be learned.

Until the user's activities are learned, the battery life of the mobile device 150 may be wasted and/or the user might be informed of various events at a sub-optimal rate. Other user activities might be included in stored histograms 610. For example, if from 7:30 to 8:00 PM the user 600 often goes out to dinner with friends the user 600 might often send text messages at a high frequency. This is noticed and a stored histogram 610 can be created. Again, if the user 600 is out and about from 8:00 to 12:00 PM this is also learned. This is noticed and a stored histogram 610 can be created. As time goes on the default histogram profile gives way to a stored histogram profile that reflects the user's activities.

The preferred method of practicing the invention keeps at least four stored histograms 606. One is a "defaulted" (see above) daily rolling histogram for driving and another is a "defaulted" record of mobile device 150 usage. Another stored histogram 606 is a weekly "absolute" driving histogram, i.e. without any default values, and the last is a weekly "absolute" mobile device 150 usage histogram.

Beneficially the client state manager 50 is implemented to use the stored histograms 606 to optimize the behavior of the application 70 by adjusting polling times. If the user 600 is typically driving at a given time period, say 7:00-7:30 PM, time bin 720 in FIG. 7, as determined by the driving stored histograms 606 the client state manager 50 increases its polling frequency to check more often to determine when driving ends and a new functionality should to be implemented by the application 70, such as unlocking the screen of the mobile device 150. Contrary, if the user 600 is typically not driving, such as at 3:00 AM, the polling frequency decreases and driving functionality is checked less often.

The application 70 can use the stored histograms 606 as a basis to query for status results, which are then used to control mobile device 150 functions. For example, an application 70 might be programmed to automatically lock the mobile device 150 when the user 600 is driving. To determine whether a user 600 is driving, the application 70 pings the client state manager 50 to request the server state manager 20 to run the activity detection logic program 606 to determine if the user 600 is driving. If the user 600 is driving the application locks the mobile device 150. If the user 600 is not driving the application 70 unlocks the mobile device. The rate at which the application 70 pings the client state manager 50 depends upon the historical records of the histograms 606.

Based on the foregoing, the histograms can be used to optimize the performance of the application 70 and/or the mobile device 150. The client state manager 50 and the application 70 adaptively learn the activities of the user and make use of that knowledge to provide an enhanced user experience.

While embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A communication network for controlling a mobile device based on a user activity, comprising:
   a mobile device having communication capability and a function dependent on a user activity;
   a client having communication capability, activity detection logic for detecting the user activity based on the function, a data collection unit for collecting and compiling a digital histogram of the user activity, a stored histogram database for storing the compiled digital histogram, and a polling mechanism for directing the activity detection logic to detect the user activity;
   wherein the polling mechanism directs the activity detection logic to poll for the user activity at a frequency based on the stored histogram; and
   wherein the client at least one of enables or disables the function based on a detection of the user activity.

2. The communication network according to claim 1, wherein the user activity is driving and the function is dependent on driving.

3. The communication network according to claim 2, wherein the stored histogram database spans a 24 hour time interval.

4. The communication network according to claim 2, wherein the compiled digital histogram includes at least one assumed value regarding driving.

5. The communication network according to claim 4, wherein the at least one assumed value is lost over time.

6. The communication network according to claim 4, wherein the significance of the at least one assumed value is reduced over time.

7. The communication network according to claim 1, wherein the function is dependent on usage of the mobile device.

8. The communication network according to claim 7, wherein the stored histogram database spans a 24 hour time interval.

9. The communication network according to claim 7, wherein the compiled digital histogram includes at least one assumption regarding usage of the mobile device.

10. The communication network according to claim 9, wherein the significance of the at least one assumption is lost over time.

11. The communication network according to claim 9, wherein the significance of the at least one assumption is reduced over time.

12. A system comprising stored computer readable coded instructions to:
   establish communications with a mobile device;
   set a mobile device function that is dependent on a user activity;
   establish communications with a server;
   implement activity detection logic for detecting the user activity based on the mobile device function setting;
   implement a data collection unit for collecting and compiling a digital histogram of the user activity detected by the activity detection logic;
   implement a stored histogram database for storing the compiled digital histogram;

create a polling mechanism for directing the activity detection logic to detect the user activity;
control the polling mechanism to direct the activity detection logic to poll for the user activity at a frequency based on the stored histogram; and
disable the mobile device function based on a detection of the user activity.

13. A communication network for operating a mobile device based on a user activity, comprising:
a mobile device having communication capability, a function dependent on a user activity, and a feature settable by a received status signal;
a server having communication capability and activity detection logic for detecting user activity based on the function;
a client having communication capability, a data collection unit for collecting and compiling a digital histogram of the user activity, a stored histogram database for storing the compiled digital histogram, a polling mechanism for directing the activity detection logic to detect the user activity, and status logic for producing a status signal; and
application software for controlling an application whose operation depends on the user activity, the application software interacting with the status logic;
wherein the polling mechanism directs the activity detection logic via the communication capability of the server and the client at a frequency based on the stored histogram; and
wherein the application directs the status logic to cause the server to transmit the received status signal when the user activity is detected.

14. The communication network according to claim 13, wherein the function is dependent on driving.

15. The communication network according to claim 14, wherein the stored histogram database spans a 24 hour time interval.

16. The communication network according to claim 14, wherein the compiled digital histogram includes at least one assumed value regarding driving.

17. The communication network according to claim 16, wherein the at least one assumed value is lost over time.

18. The communication network according to claim 16, wherein the significance of the at least one assumed value is reduced over time.

19. The communication network according to claim 14 wherein driving is detected based on an average rate of travel of the mobile device.

20. The communication network according to claim 14, wherein the stored histogram database spans a 24 hour time interval.

21. The communication network according to claim 14, wherein the compiled digital histogram includes at least one assumption regarding usage of the mobile device.

22. The communication network according to claim 21, wherein the significance of the at least one assumption is lost over time.

23. The communication network according to claim 21, wherein the significance of the at least one assumption is reduced over time.

24. The communication network according to claim 13, wherein the application directs the status logic to cause the server to transmit the received status signal when the user activity changes.

25. The communication network according to claim 13, wherein the stored histogram contains an absolute history of all user activities from a given start time.

26. The communication network according to claim 13, wherein the stored histogram contains no more than 'n' time bins of data, wherein older data is discarded.

27. The communication network according to claim 13, wherein the function is dependent on usage of the mobile device.

28. A method network for controlling a mobile device based on a user activity comprising:
providing a processor-enabled mobile device having communication capability, a client application, and a function;
polling by the client application a signal source of the mobile device at a first particular frequency;
determining by the polling of the signal source a user activity;
compiling a digital histogram of the user activity;
polling by the client application the signal source of the mobile device at a second particular frequency based on the digital histogram of the user activity; and
disabling the function of the mobile device based on the user activity.

* * * * *